C. C. FORNCROOK.
Bob-Sleigh.
No. 214,290.  Patented April 15, 1879.
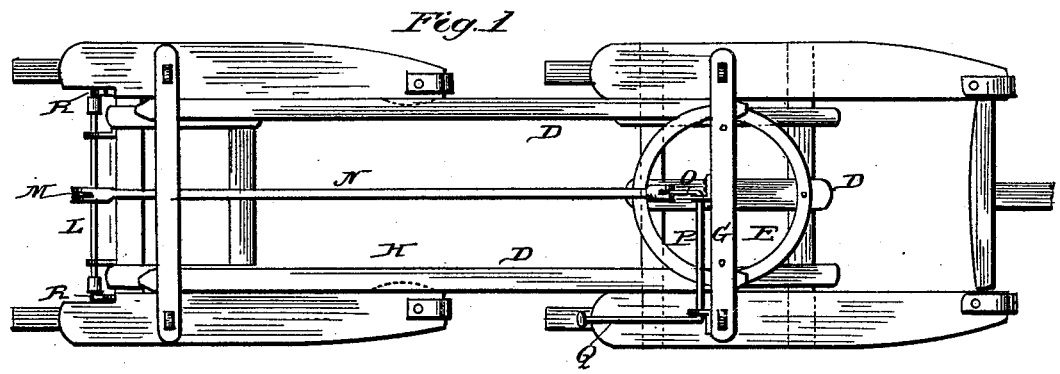
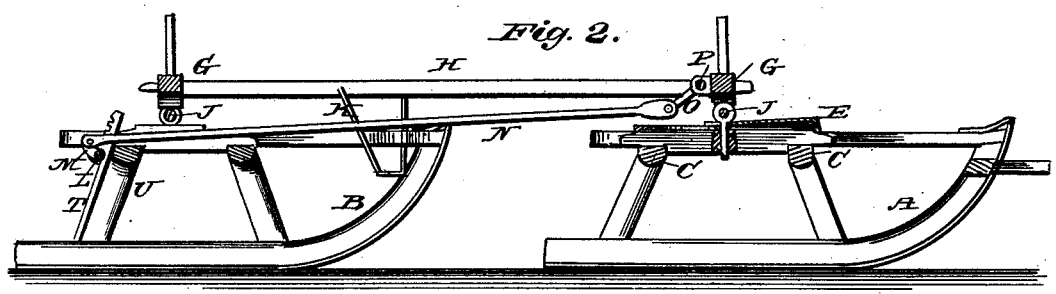
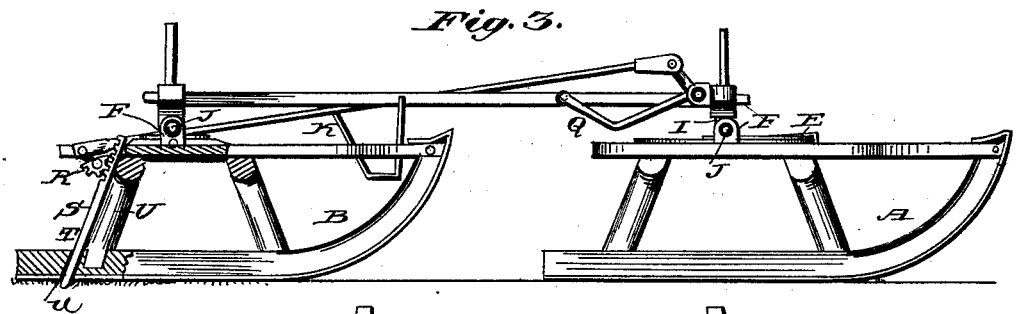
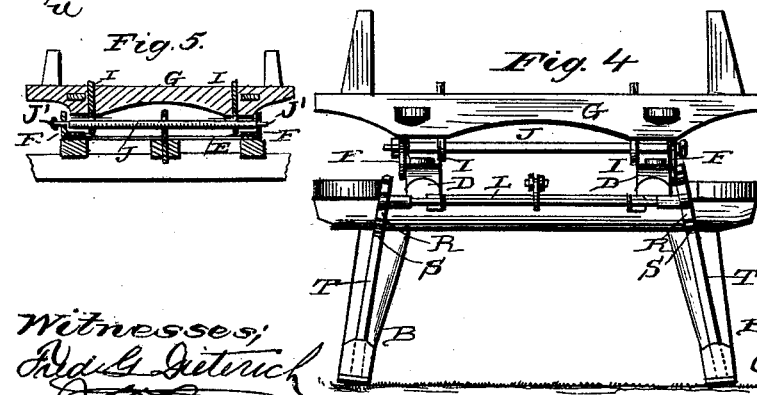

UNITED STATES PATENT OFFICE.

CHARLES C. FORNCROOK, OF HERMITAGE, NEW YORK.

IMPROVEMENT IN BOB-SLEIGHS.

Specification forming part of Letters Patent No. 214,290, dated April 15, 1879; application filed January 27, 1879.

*To all whom it may concern:*

Be it known that I, C. C. FORNCROOK, of Hermitage, in the county of Wyoming and State of New York, have invented certain new and useful Improvements in Bob-Sleighs; and I do hereby declare that the following is a full, clear, and exact description of the invention, which will enable others skilled in the art to which it appertains to make and use the same, reference being had to the accompanying drawings, which form a part of this specification.

Figure 1 is a top view. Fig. 2 is a longitudinal vertical section. Fig. 3 is a side view, part being broken away to show the construction. Fig. 4 is a rear elevation, and Fig. 5 is a cross-section through the front runners and bolster.

Corresponding parts in the several figures are denoted by like letters of reference.

This invention relates to bob-sleighs; and it consists in certain improvements in the construction of the same, as will be hereinafter more fully described, and particularly pointed out in the claims.

In the drawings, A represents the fore, and B the hind, runners or bobs. The runners A are provided with cross-bars C, supporting longitudinal bars D, upon which rests the fifth-wheel E. The latter is constructed, in the usual manner, of wrought-iron sections or circles, of which the upper one is provided with upwardly-projecting perforated lugs F. The forward bolster, G, of the reach-frame H is provided with staples I, through which I pass a tube, (such as a gas-pipe,) J. The tube J is of such a length as to fit between the lugs F F, and through the latter and tube J, I pass a rod, J', thus hinging the forward runners to the reach-frame. The rear runners are similarly hinged to the rear bolster, with the exception that the lugs F project directly from the longitudinal bars D of the runners, as shown.

The sides of the reach-frame are provided with bails K K, of which one arm of each passes through a suitable perforation in the side of the rear runner, the motion of which is thus confined.

In suitable bearings upon the rear end of the rear bob I arrange a shaft, L, having an arm, M, connected by a rod, N, with an arm, O, upon a shaft, P, arranged in suitable bearings upon the forward bolster. The latter shaft has a lever-handle, Q, convenient to the driver.

The ends of shaft L have segmental racks R, engaging racks S, formed upon rods T, which slide in suitable grooves formed in the rear uprights, U, of the runner. The rods T pass through perforations $u$ in the runners, and may be forced through these down into the ground. This, it will be seen, can be easily effected by operating the lever Q, and the brake formed by rods T is therefore at all times under perfect control of the driver.

Having thus described my invention, I claim and desire to secure by Letters Patent of the United States—

1. The combination, with the reach-frame H, having bails K, of the hinged rear bob, B, the sides of which have perforations working upon the arms of said bails, substantially as and for the purpose herein set forth.

2. The combination, with the bobs A B, of the shaft L, having arm M and segmental racks R, sliding brake-rods T, having racks S, shaft P, having arm O and lever-handle Q, and connecting-rod N, all arranged and operating substantially as and for the purpose herein shown and specified.

In testimony that I claim the foregoing as my own I have hereto affixed my signature in presence of two witnesses.

CHARLES COOK FORNCROOK.

Witnesses:
AUGUSTUS MORGAN,
JOHN W. ZEAK.